(12) United States Patent
Van Schoor

(10) Patent No.: US 7,686,308 B2
(45) Date of Patent: Mar. 30, 2010

(54) FLUID-ACTIVATED SHAFT SEAL

(75) Inventor: Marthinus C. Van Schoor, Medford, MA (US)

(73) Assignee: MIDE Technology Corporation, Medford, MA (US)

( * ) Notice: Subject to any disclaimer, the term of this patent is extended or adjusted under 35 U.S.C. 154(b) by 0 days.

(21) Appl. No.: 11/286,680

(22) Filed: Nov. 22, 2005

(65) Prior Publication Data

US 2006/0108745 A1    May 25, 2006

Related U.S. Application Data

(60) Provisional application No. 60/629,911, filed on Nov. 22, 2004.

(51) Int. Cl.
*F16J 15/32* (2006.01)
(52) U.S. Cl. .................. 277/553; 277/551; 277/580; 277/564; 277/566; 277/934
(58) Field of Classification Search ............. 277/551, 277/553, 563, 934, 580, 564, 579, 566
See application file for complete search history.

(56) References Cited

U.S. PATENT DOCUMENTS

| 2,565,923 | A | * | 8/1951 | Hrdlicka, Jr. ............... 277/346 |
| 2,849,070 | A | * | 8/1958 | Maly .......................... 277/336 |
| 3,413,008 | A | * | 11/1968 | Greiner ..................... 277/505 |
| 3,726,531 | A | * | 4/1973 | Pagan et al. ............... 277/563 |
| 3,934,952 | A | * | 1/1976 | Gardner ..................... 384/97 |
| 3,948,531 | A | | 4/1976 | Mitrani ....................... 277/9 |
| 4,155,957 | A | | 5/1979 | Sasayama ............... 260/897 B |
| 4,182,518 | A | | 1/1980 | Bunyan ....................... 277/65 |
| 4,188,039 | A | | 2/1980 | Krisak et al. .............. 277/95 |
| 4,348,031 | A | | 9/1982 | Johnston ..................... 277/83 |

(Continued)

FOREIGN PATENT DOCUMENTS

DE    41 21 193 A    1/1993

(Continued)

OTHER PUBLICATIONS

International Search Report for PCT/US2005/042683 mailed on Jun. 30, 2006, (4 pages).

(Continued)

*Primary Examiner*—Alison K Pickard
(74) *Attorney, Agent, or Firm*—Iandiorio Teska & Coleman

(57) ABSTRACT

Systems and methods associated with a fluid-activated shaft seal are provided. The system includes a housing and a seal disposed relative to the housing. The method reduces flow of a fluid between the shaft and the housing. The method involves installing the housing in an opening relative to the shaft and locating the seal relative to the housing. The seal includes a gel material that expands when exposed to a fluid. The seal reduces flow of the fluid through a gap between the housing and the shaft. Advantages of the system and method include reduced wear to the seal due to friction because the seal does not engage the shaft in the absence of a fluid. The seal engages the shaft in the presence of a fluid. Sealing quality is improved by increasing the pressure differential acting on the gel material. In some embodiments, the seal includes a lip portion.

5 Claims, 6 Drawing Sheets

U.S. PATENT DOCUMENTS

| | | | | |
|---|---|---|---|---|
| 4,403,779 | A | | 9/1983 | Wilkinson .................... 277/27 |
| 4,449,713 | A | * | 5/1984 | Ishido et al. ................. 277/312 |
| 4,449,719 | A | | 5/1984 | Radosay et al. ............. 277/192 |
| 4,471,964 | A | * | 9/1984 | Kotzur ........................ 277/347 |
| 4,595,206 | A | | 6/1986 | Hölzer ......................... 277/25 |
| 4,643,439 | A | | 2/1987 | Lewis et al. ................... 277/95 |
| 4,740,404 | A | * | 4/1988 | Otsugu et al. ................. 428/44 |
| 4,954,084 | A | | 9/1990 | Pugh et al. .................... 439/29 |
| 5,024,450 | A | | 6/1991 | Hawley et al. ................ 277/37 |
| 5,096,356 | A | | 3/1992 | Foster ......................... 414/325 |
| 5,125,502 | A | | 6/1992 | Foster ......................... 198/750 |
| 5,176,677 | A | | 1/1993 | Wuchinich ................... 606/46 |
| 5,216,840 | A | | 6/1993 | Andrews .................... 49/483.1 |
| 5,277,915 | A | * | 1/1994 | Provonchee et al. ........ 424/485 |
| 5,624,290 | A | * | 4/1997 | Von Bergen et al. .......... 440/80 |
| 5,639,098 | A | | 6/1997 | MacDonald ................. 277/88 |
| 5,643,026 | A | * | 7/1997 | Pietsch et al. ............... 440/112 |
| 6,039,320 | A | | 3/2000 | MacDonald ................. 277/370 |
| 6,224,058 | B1 | * | 5/2001 | Drebing et al. .............. 277/313 |
| 6,234,910 | B1 | | 5/2001 | Norberg ...................... 464/182 |
| 6,240,321 | B1 | | 5/2001 | Janke et al. .................. 607/122 |
| 6,254,102 | B1 | | 7/2001 | Vicory, Sr. ................... 277/390 |
| 6,303,711 | B1 | * | 10/2001 | Sumiya et al. ................. 526/73 |
| 6,375,901 | B1 | * | 4/2002 | Robotti et al. ............... 422/103 |
| 6,524,151 | B1 | | 2/2003 | Clemente et al. ............ 440/112 |
| 6,698,669 | B2 | | 3/2004 | Rieben ..................... 239/225.1 |
| 6,702,300 | B1 | | 3/2004 | Steinetz et al. ............... 277/642 |
| 7,313,829 | B1 | | 1/2008 | Serra et al. ..................... 2/2.15 |
| 2002/0016622 | A1 | | 2/2002 | Janke et al. .................. 607/116 |
| 2003/0010486 | A1 | * | 1/2003 | Serra et al. ................... 165/185 |
| 2004/0009205 | A1 | * | 1/2004 | Sawhney .................... 424/423 |
| 2005/0038368 | A1 | * | 2/2005 | Richter et al. ................. 602/41 |

FOREIGN PATENT DOCUMENTS

| | | | |
|---|---|---|---|
| JP | 60-192167 | * | 9/1985 |
| JP | 63-87309 | * | 4/1988 |
| JP | 10-73188 | * | 3/1998 |
| JP | 11-324506 | * | 11/1999 |

OTHER PUBLICATIONS

First Amended Verified Complaint and Jury Demand, Civil Action No. 1:08-cv-11133-RGS, filed Dec. 18, 2008 in the United States District Court for the District of Massachusetts.

* cited by examiner

FLUID-ACTIVATED SHAFT SEAL

CROSS-REFERENCE TO RELATED APPLICATIONS

This application claims the benefit of U.S. application Ser. No. 60/629,911, which was filed on Nov. 22, 2004, and the contents of which are hereby incorporated herein by reference.

GOVERNMENT SUPPORT

Portions of the concepts described herein were made or developed with government support under Contract Number N65538-04-M-0157. The federal government may have certain rights in such concepts.

TECHNICAL FIELD

The invention generally relates to seals, and, in particular, to fluid-activated shaft seals incorporating a gel material.

BACKGROUND

Many industrial applications require a shaft to pass from one area of a structure through a wall to another area of the structure. The shaft generally passes through an opening in the wall and moves relative to the position of the wall. For example, the shaft can translate, rotate, or move in some combination of translation and rotation (e.g., twisting, bending, or stretching) about an axis of the shaft through the surface. A spatial clearance generally exists between the shaft and the opening in the wall to facilitate this movement.

Some applications that involve moving shafts require fluid isolation between the separate areas of the structure so that a leak or contamination in one area of the structure does not migrate or flow to an adjacent area of the structure via the clearance between the shaft and the opening in the wall. For example, a propulsion shaft that extends along the length of the hull of a ship passes through several bulkheads that separate different compartments of the ship. Preventing a water leak in one compartment from advancing past a bulkhead into the next compartment along the shaft is critical in preventing the hull from filling with water and sinking the ship. Shaft seals are typically used to limit the flow of fluids from one bulkhead to the next during, for example, rotation of the shaft relative to the shaft opening in the ship structure.

An example of a conventional shaft seal designed to rotate as the shaft rotates during shaft operation is the ND-type shaft seal sold by Wartsila-Lips, Inc. of Poulsbo, Wash. The ND-type seal includes an o-ring positioned at a rubber molding-shaft interface, such that both the molding and the o-ring spin as the shaft spins. A pressure differential across the o-ring generated by an unequal amount of pressure on either side of a bulkhead causes the rubber molding to deform and press against the housing, which is positioned about the opening. Rotation of the molding is hindered when the molding presses against the housing. The stationary molding creates a seal against the housing and forces the o-ring into contact with the shaft. The o-ring also stops spinning and creates a fluid seal with respect to the shaft.

One drawback of the ND-type shaft seal is that contact between the sealing components and the shaft while the sealing components are dry leads to premature failure of the sealing components caused by the associated friction-induced wear on the o-ring and the rubber molding. Current shipbuilding specifications generally require a pressure differential between the opposing surfaces of the sealing components of about 1/3 psig (pounds per square inch gauge or about 234.1 kg/m$^2$), or roughly 8-9 inches (about 203-229 mm) of water before the seal engages the shaft. The presence of water assists in creating a water-tight interface between the shaft and the sealing components (e.g., the molding and the o-ring). The ND-type seals have activated (e.g., contacted the shaft) in the presence of as little as 0.6-0.9 inches (about 15.2-22.9 mm) of water. The sealing components contact the shaft while the sealing components are relatively dry and lead to premature wear. Additionally, a pressure differential insufficient to generate a fluid-tight seal develops between opposing sealing components when the sealing components are activated in the presence of relatively small quantities of water. When a fluid-tight seal does not develop, leakage rates associated with the shaft and sealing components can be in excess of shipbuilder specifications.

For example, shipbuilder specifications generally require self-activating bulkhead shaft seals with a maximum leakage rate of 0.5 U.S. pint/hour (about 0.065 ml/s). Self-activating shaft seals generally do not require human operation (e.g., adjustment of the seals) after installation with respect to a shaft and during a leak. For the DDG-type destroyer, the maximum leakage rate permitted under the shipbuilder specifications is 1 U.S. pint/minute (about 0.1314 ml/s). Activation of the seal in the presence of a relatively low pressure differential (e.g., premature activation caused by relatively low water levels discussed above) causes accelerated wear of the seal components. Accelerated wear of a seal leads to premature failure of the seal and noncompliance with shipbuilder specifications.

Hence, there is a need for self-activating shaft seals that do not prematurely activate in the presence of relatively small amounts of fluid. There also is a need for shaft seals designed to resist premature wear. There also is a need for shaft seals whose design can be scaled to effectively seal shafts of a variety of diameters. For example, there is a need for shaft seal designs for relatively small diameter shafts and relatively large diameter shafts, both of which can be found on destroyers or various industrial applications.

SUMMARY

The concepts described herein address these and other issues associated with current shaft seal designs by associating the seal with a gel material that expands when exposed to a fluid. In one embodiment, seal designs employing such materials generally are not in contact with the moving shaft in absence of a fluid. Separation between the seal and the shaft prolongs the life of the seal by reducing the effects of friction on the seal in the absence of a fluid. When the gel material expands, the seal is deformed and urged into contact with the shaft. Various features and advantages associated with such seals are described below.

The invention, in one aspect, features a system that includes a housing and a seal disposed relative to the housing. The seal includes a gel material that expands when exposed to a fluid for reducing a flow of the fluid through a gap or clearance between the housing and a shaft. The seal includes a lip portion and expansion of the gel material urges the lip portion into contact with the shaft.

In some embodiments, the seal reduces the flow area associated with the gap between the housing and the shaft. In some embodiments, the seal is urged into contact with the shaft by the expansion of the gel material and substantially eliminates the flow area (e.g., by closing the gap). In some embodiments, the gel material is adapted to contract in the absence of a fluid for at least one of forming or increasing the gap between the seal and the shaft. In one embodiment, after fluid is removed from the compartment, the gel material dries out and contracts to permit the seal to deform back to the original shape the seal occupied before exposure to the fluid. In some embodiments, expansion of the gel material is a reversible process or effect. In some embodiments, the shaft passes through a bulkhead (e.g., a propeller shaft that passes through the hull of a vessel). In some embodiments, the gel material is formed by embedding gel particles into an open cell foam. In some embodiments, the open cell foam is a hard open cell foam or a soft open cell foam. In some embodiments, the open cell foam is shaped to fit within a pocket of the seal.

In some embodiments, the seal includes a lip seal. The seal or the lip seal can include an elastomeric material, a natural rubber material, or a synthetic rubber material. In some embodiments, the seal includes a low-wear material to reduce friction between the seal and the shaft. The low-wear material can be a Teflon® material, for example, molded, bonded, coated, or otherwise secured or applied to the seal. The low-wear material reduces friction between the shaft and the seal that may occur during long-term contact between the shaft and the seal. In some embodiments, the system includes an alignment ring adapted to align the seal relative to the housing, the shaft, or both. In some embodiments, the alignment ring includes a contact surface with respect to the shaft, and a low-wear material is used to reduce friction between the alignment ring and the shaft. In some embodiments, the low-wear material comprises a Teflon® material. In some embodiments, the low-wear material is secured with respect to the seal by at least one of bonding, seating, fitting, coupling, or any combination of these. In some embodiments, the seal captures the low-wear material, for example, through a groove, a pocket, interference fit (e.g., a diametral interference fit), or a friction fit. The alignment ring can be formed from a low-wear or a low-friction material, for example, a Teflon® material.

In some embodiments, the system includes a second seal that comprises a second gel material that expands when exposed to the fluid and reduces the flow of the fluid through the gap between the housing and the shaft. In some embodiments, the seal reduces the flow of the fluid through the gap between the housing and the shaft along a first direction and the second seal reduces a second flow between the housing and the shaft along a second direction. In some embodiments, the second direction is substantially opposite the first direction.

In some embodiments, the seal is a backup seal. The seal can reduce the flow of the fluid between the housing and the shaft during motion of the shaft (e.g., rotation, translation, or any combination of these) relative to the housing. In some embodiments, a pressure differential is maintained across the seal when the seal is exposed to the fluid. The pressure differential can improve the performance of the seal, for example, by interacting with the gel material and causing the gel material to expand.

The invention, in another aspect, features a method for reducing a flow of a fluid between a shaft and a housing. The method involves installing the housing in an opening relative to a shaft. The method also involves locating a seal relative to the housing. The seal comprises a gel material that expands when exposed to the fluid and reduces a flow of the fluid through a gap between the housing and the shaft.

In some embodiments, the method involves installing at least one alignment ring adapted to align the seal relative to the housing, the shaft, or both. In some embodiments, the method involves coupling an alignment ring to the seal for aligning the housing relative to the seal. In some embodiments, the method involves installing a second seal comprising a second gel material that expands when exposed to the fluid that reduces a second flow of the fluid through the gap between the housing and the shaft. In some embodiments, the method involves installing a second alignment ring adapted to align the seal relative to the housing, the shaft, or both. In some embodiments, the method involves securing a low-wear material with respect to the seal, and securing includes at least one of bonding, seating, fitting, coupling, or any combination of these. In some embodiments, securing includes the seal capturing the low-wear material, for example, through a groove, a pocket, interference fit (e.g., a diametral interference fit), or a friction fit.

The invention, in another aspect, features a system that includes a housing disposed relative to a shaft, and a means for reducing a gap between the housing and the shaft in response to exposure to a fluid. The means for reducing the gap includes a fluid-responsive gel material.

The invention, in another aspect, features a system that includes a housing and a seal disposed relative to the housing. The seal includes a gel material that expands when exposed to a fluid for reducing a flow of the fluid through a gap between the housing and a structure.

In some embodiments, a portion of the seal is not in contact with the structure in the absence of fluid, for example, to reduce wear associated with friction on components of the system such as the seal. In some embodiments, a portion of the seal contacts the structure when the seal is exposed to the fluid. In some embodiments, the seal includes a lip portion and expansion of the gel material urges the lip portion into contact with the structure.

In other embodiments of the invention, any of the aspects above can include one or more of the above features. One embodiment of the invention can provide all of the above features and advantages.

These and other features will be more fully understood by reference to the following description and drawings, which are illustrative and not necessarily to scale.

DETAILED DESCRIPTION

Figure 1:
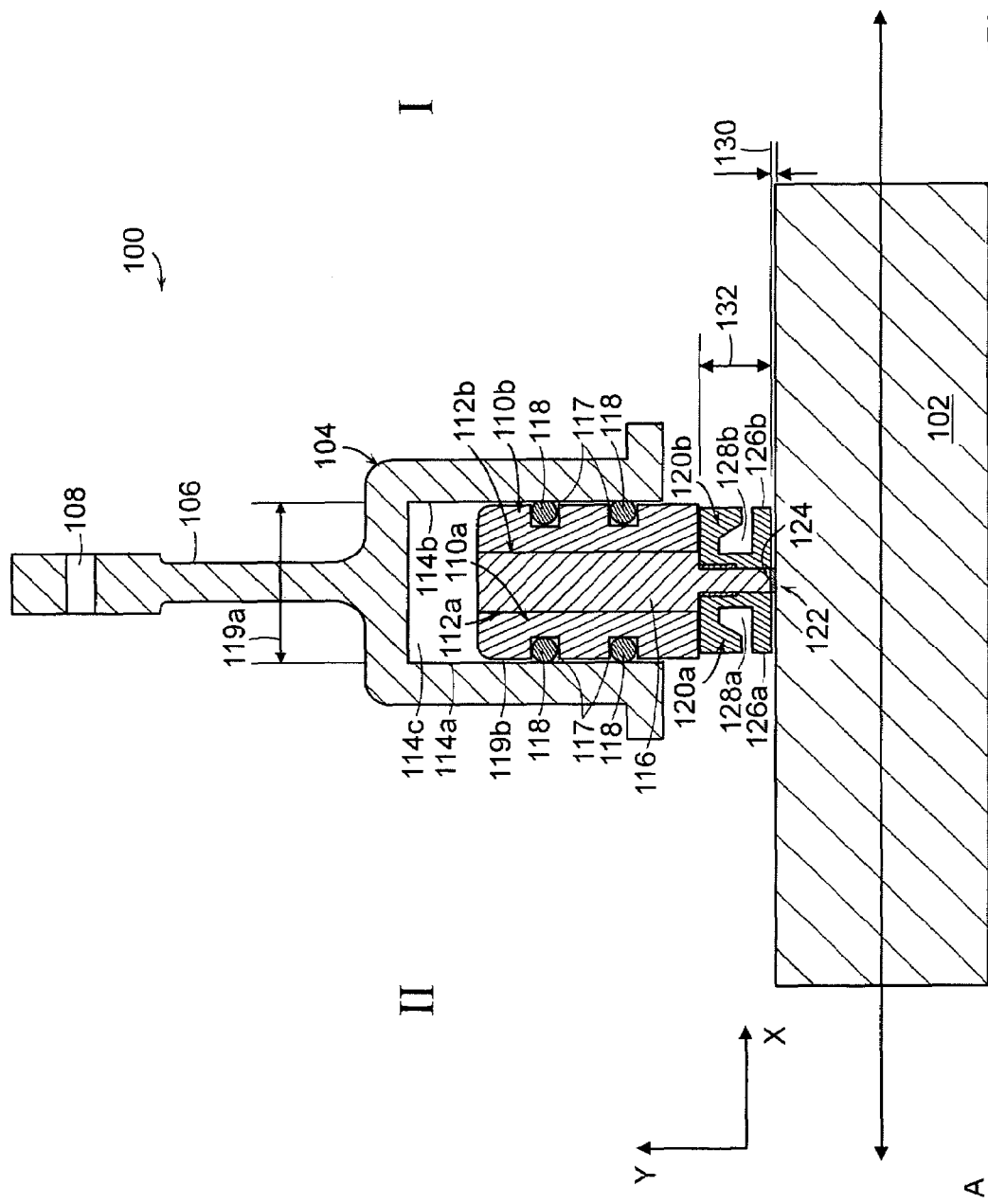
FIG. 1 is a cross-sectional view of a portion of a system that reduces a flow of a fluid between a shaft and a housing that embodies the invention.

FIG. 1 is a cross-sectional view of a system 100 that reduces a flow of a fluid between a shaft and a housing that embodies the invention. The system 100 is designed for installation and use with a shaft 102 that defines a longitudinal axis A. The system 100 includes a housing 104 coupled to an extensive portion 106 that defines one or more through-holes 108. The system 100 can be secured or mounted fixedly with respect to the shaft 102, for example, by passing one or more bolts through the through-holes 108 to corresponding holes (not shown) on a support surface or bulkhead (not shown). In some embodiments, the bolts thread directly into the corresponding holes. In some embodiments, the corresponding holes are instead through-holes, and the system 100 is secured by threading the bolts securely to one or more nuts on the opposite side of the support surface or bulkhead (e.g., in a different area of the structure).

The system 100 features two connection plates 110a and 110b disposed within the housing 104. The connection plates 110a and 110b define two surfaces 112a and 112b. Surface 112a of connection plate 110a faces an interior surface 114b of the housing 104. Surface 112b of connection plate 110b faces an interior surface 114a of the housing 104. The system 100 includes an alignment ring 116. The alignment ring 116 is designed to fit relatively between the surfaces 112a and 112b of the connection plates 110a and 110b. The combination of the connection plates 110a and 110b and the alignment ring 116 are designed to fit relatively loosely between the surfaces 114a and 114b of the housing 104. The connection plates 110a and 110b define annular grooves 117. The alignment ring 116 defines corresponding annular grooves (not shown) for housing one or more o-rings 118. In some embodiments, the annular grooves of the alignment ring 116 cooperate with the annular grooves 117 of the connection plates 110a and 110b to form a substantially continuous annular groove for seating the 0-rings 118. In some embodiments, the alignment ring 116 is manufactured from a low-wear or low-friction material, for example, a Teflon® material.

The combined thickness of the connection plates 110a and 110b and the alignment ring 116 is slightly less than distance 119a of the housing 104 (i.e., the distance along the X-axis between the surfaces 114a and 114b). A slight clearance 119b exists between the housing 104 and the combination of the alignment ring 116 and the connection plates 110a and 110b. The o-rings 118 provide a seal between the combination of the connection plates 110a and 110b and the alignment ring 116 and the housing 104 to hinder fluid from entering an interior region 114c of the housing 104. Additionally, the 0-rings 118 allow the connection plates 110a and 110b and the alignment ring 116 to flex or move relative to the shaft 102 to accommodate, for example, translations of the shaft 102 along the Y-axis without overstressing the housing 104 (e.g., the extensive portion 106, the through-holes 108, or the surface to which the housing 104 is secured). In some embodiments, the shaft 102 moves with respect to the housing 104 (e.g., a propeller shaft on a ship). The shaft 102 can move by translation or rotation or some combination of translation and rotation (e.g., twisting) with respect to the housing 104. In some embodiments, the shaft 102 is stationary with respect to the housing 104. Examples of stationary shafts include conduits, pipes, electrical cables, and other structures that pass through a surface.

The system 100 also features two seals 120a and 120b positioned relative to the shaft 102. The seals 120a and 120b are positioned in abutting relation to the connection plates 110a and 110b and the alignment ring 116. In some embodiments, the seals 120a and 120b are coupled to the alignment ring 116, for example, by bonding the seals 120a and 120b to the alignment ring 116. In some embodiments, the seals 120a and 120b and the alignment ring 116 are a unitary structure formed from the same material. A ring 122 is disposed between the shaft 102 and a bottom face 124 of the alignment ring 116.

In some embodiments, the ring 122 is made from a Teflon® material or other low-wear or low-friction material. During assembly and in operation, the ring 122 can be used to align the various components of the system 100. For example, the ring 122 can align the alignment ring 116 and the connection plates 110a and 110b with respect to the housing 104 and the shaft 102. In some embodiments, the ring 122 is not included in the system 100. In some embodiments, the ring 122 is coupled to the shaft 102 such that the ring 122 moves (e.g., rotates or translates) as the shaft 102 moves. In some embodiments, a gap between the ring 122 and the shaft 102 is sufficiently small to reduce an air or fluid flow through the gap. In some embodiments, the ring 122 or other low-wear material is secured with respect to the seals 120a and 120b, for example, by bonding, seating, fitting, coupling, or some combination of these. The ring 122 or other low-wear material can be captured by the seals 120a and 120b, for example, by a groove (not shown), a pocket (not shown), or other types of fits, such as a diametral interference fit or a friction fit.

In this embodiment, the ring 122 has a thickness of about 0.1 mm (along the Y-axis), approximately equal to the radial clearance 130 between the lips 126a and 126b of each of the seals 120a and 120b relative to the shaft 102. Some embodiments feature a radial clearance 130 between the lips 126a and 126b and the shaft 102 that is greater than the thickness of the ring 122. In some embodiments, the clearance 132 between the shaft-facing surface of the lips 126a and 126b of the seals 120a and 120b and the connection plate-facing surface of the seals 120a and 120b is about 25 mm. In some embodiments, the clearance 132 is approximately 12.7 mm. Alternate geometries and dimensions are contemplated and within the scope of the invention.

The seals 120a and 120b each define a pocket 128a and 128b, respectively. The pockets 128a and 128b are filled with a gel material (also referred to herein as a gel). In some embodiments, the gel material is a hydrogel, an acrylamide gel (e.g., a "smart" gel), or other gels that expand in the presence of a fluid. In some embodiments, the seals 120a and 120b comprise a pliable or bendable material, for example, an elastomeric material, a natural rubber material, or a synthetic rubber material.

In some embodiments, the seal comprises a material having a hardness of about Shore A60. In general, the gel material expands when exposed to a fluid and reacts against the interior surfaces of the pockets 128a and 128b. Because the seals 120a and 120b are pliable, as the gel material expands, the lips 126a and 126b of the seals 120a and 120b are urged into contact with the shaft 102 to form a sealing arrangement. In this manner, the lips 126a and 126b reduce or eliminate the flow area associated with the clearance 130 between the lips 126a and 126b and the shaft 102. In some embodiments, the seals 120a and 120b include a low-wear material, for example a Teflon® material to reduce friction between the seals 120a and 120b and the shaft 102. For example, the low-wear material can be secured or applied (e.g., molded, bonded, or surface coated) to the lips 126a and 126b.

Tests have shown that in one embodiment, the gel material can produce more than about 37 psi (about 26,010 kg/m$^2$) of pressure against the lips 126a and 126b in forcing the lips 126a and 126b into contact with the shaft 102.

In this embodiment, the system 100 defines a first compartment I and a second compartment II that are generally not in fluid communication with each other. Compartment I is separated from compartment II by, for example, a surface (e.g., a bulkhead of a ship) coupled to the housing 104. Exemplary operation of the system 100 occurs when a fluid leak occurs in a first compartment I. A pressure differential develops between the first compartment I and a second compartment II. The fluid tends to migrate from the first compartment I to the second compartment II via the clearance 130 between the seals 120a and 120b and the shaft 102.

In some embodiments, the fluid contacts the gel material disposed in the pocket 128b (e.g., by splashing or inundation), causing the gel material to expand and react against the inside surface of the pocket 128b to urge the lip 126b into contact with the shaft 102. In some embodiments, the gel material expands and urges the lip 126b into contact with the shaft 102 within several seconds after exposure of the gel material to the fluid. The system 100 can be used with a variety of naturally-occurring or synthetic fluids, for example, freshwater, salt water, acids, alkaline fluids, blood or other biological fluids, and oils. In general, the type of fluid that is present influences the choice of gel material used in the system 100. Gel materials can respond (e.g., expand and contract) based, in part, on properties of the fluid.

Generally, the seal 120b is not activated (i.e., the lip 126b does not move towards the shaft 102) until fluid is present because the gel material does not expand in the absence of a fluid. When the lip 126b is in contact with the shaft 102, the clearance 130 or gap between the lip 126b and the shaft 102 is reduced, which reduces the flow area through which the migrating fluid passes. The pressure differential between the first compartment I and the second compartment II is increased as the lip 126b approaches or comes into contact with the shaft 102. In some embodiments, the ability of the lip 126b to reduce the flow through the clearance 130 increases as the pressure differential between the first compartment I and the second compartment II increases. The o-rings 118 hinder fluid from migrating from the first compartment I to the second compartment II through the housing 104 by sealing the combination of the alignment ring 116 and the connection plates 110a and 110b with respect to the inside surfaces 114a and 114b of the housing 104.

In some embodiments, the pressure differential that occurs when the lip 126b engages the shaft 102 also operates on the gel material disposed in the pocket 128a of the seal 120a that faces the second compartment II. The pressure differential causes the gel material in the pocket 128a to expand, and force the lip 126a to also engage the shaft 102. In some embodiments, the lip 126a of the seal 120a forms a backup seal to hinder fluid from entering the second compartment II if the seal 120b (e.g., the lip 126b) facing the first compartment I fails (e.g., due to wear). In some embodiments, some fluid migrates from the first compartment I to the second compartment II and contacts or wets the gel material disposed in the pocket 128a. When the gel material in the pocket 128a is exposed to the fluid, the lip 126a of the seal 120a moves towards and/or into contact with the shaft 102. In this manner, fluid in the second compartment II is hindered from migrating back to the first compartment I by the operation of the seal 120a.

After the seals 120a and 120b have been activated by exposure to a fluid, the lips 126a and 126b remain in contact with the shaft 102 until the fluid is removed and the seals 120a and 120b are dried (e.g., by the application of heat). In some embodiments, the seals 120a and 120b are dried by exposure to air. The gel material contracts in the absence of a fluid, for example, when the gel material is dried. As the gel material contracts, the seals 120a and 120b deform back to the original shape that the seals 120a and 120b occupied prior to exposure to the fluid (e.g., prior to the leak). The system 100 can be used for multiple leaks without being replaced because expansion of the gel material is a reversible effect (e.g., by contraction of the gel material).

Generally, a gel is a colloid material in which dispersed particles couple to the dispersion medium to form a semi-solid material. Gels are sometimes classified according to the dispersion medium associated with the gel. For example, the dispersion medium for a hydrogel is water, and the dispersion medium for an acrylamide gel is acetone.

Gel materials used in some embodiments of the invention are generated by immersing polymer strands (e.g., gel particles) into a solution (e.g., water or acetone). In some embodiments, gel particles are suspended in the dispersion medium. In some embodiments, a gel changes volume (e.g., expands or contracts) in response to the environment to which the gel is exposed. The change in volume of the gel material is directly proportional to a property of the gel material known as Osmotic pressure. Osmotic pressure depends on a variety of factors, for example, temperature, ionization of the dispersion medium, concentration of the solution (e.g., of acetone), or the external forces (e.g., pressure) acting on the gel material. Generally, the gel seeks to occupy the state with lowest thermodynamic energy (e.g., lowest Osmotic pressure). In the absence of external forces (e.g., Osmotic pressure of 0 $N/m^2$), the gel collapses unto itself. For example, some acrylamide gels (also called "smart gels") can reduce in volume by a factor of about 1,000 when exposed to appropriate external conditions sufficient to cause a phase change in the smart gel.

In general, environmental changes affect a gel material by causing the gel to undergo a reversible volumetric change. Such environmental changes include changes in temperature, pH of the fluid, ionic strength of the fluid, light, and electromagnetic fields in the presence of the gel. The environmental changes generally cause the volume of the gel material to expand or contract in response to changes in the environment. The range of environmental values over which the gel material experiences volumetric change can be referred to as the environmental volume phase transition region of the gel and varies depending on the type of gel material. By way of example, a particular gel may contract as the temperature of the gel or a fluid in contact with the gel increases. Similarly, the gel may expand as the temperature of the gel or fluid in contact with the gel decreases.

In some embodiments, a gel material is selected for use in the system 100 based on the gel's ability to undergo a "discontinuous" volume change. Discontinuous volume changes involve a reversible transition by the gel material from the expanded to the contracted (or collapsed) state and back again. In some embodiments, the volume change is a substantial volume change in response to a relatively small change in the environmental condition. In some embodiments, temperature changes of less than about 0.1° C. result in a discontinuous volume change. Such gel materials may be referred to as "phase-transition gels." The environmental condition can be referred to as the "phase transition temperature" because the gel undergoes volumetric change at or about the phase transition temperature. In some embodiments, as the temperature drops to below the phase transition temperature, the gel material expands and urges the lips 126a and 126b into contact with the shaft 102. In some embodiments, absence of a fluid or as the temperature rises above the phase transition temperature causes the gel material to contract and permits the lips 126a and 126b to deform away from the shaft 102.

In some embodiments, the gel material (e.g., pellets or packets of gel material) is embedded into a foam material. In some embodiments, the foam material is an open cell foam material. In some embodiments, the open cell foam material is a soft open cell foam material. Examples of suitable open-cell foam materials include urethane foam or low-density polyurethane foam, for example, sold by Rynel, Inc. of Boothbay, Me.

In some embodiments, less gel material is used when a foam material is used because the foam material occupies space within the pockets 128a and 128b. The foam material is used as a containment vehicle for the gel material (e.g., individual gel particles or polymer strands) and can prevent migration of the gel material. In some embodiments, the gel material within the foam expands when exposed to a fluid. The expansion of the gel causes the foam to expand. The expanding foam reacts against the pockets 128a and 128b of the seals 120a and 120b to deform the seals 120a and 120b and urge the lips 126a and 126b into contact with shaft 102.

In some embodiments, the gel material is disposed within a liquid permeable sleeve or tube (not shown). The sleeve can be placed within the pockets 128a and 128b of the seals 120a and 120b. In some embodiments, the sleeve is made from a mesh material that permits water to permeate in and out of the sleeve but prevents the gel material from permeating out of the sleeve. A sleeve containing gel material can be made and used in seals having a variety of geometries because the sleeve and gel material can assume the shape of the seal or pockets of the seal. In some embodiments, a greater amount of gel material can be contained in a sleeve than could otherwise be embedded in a foam material.

Figure 2:
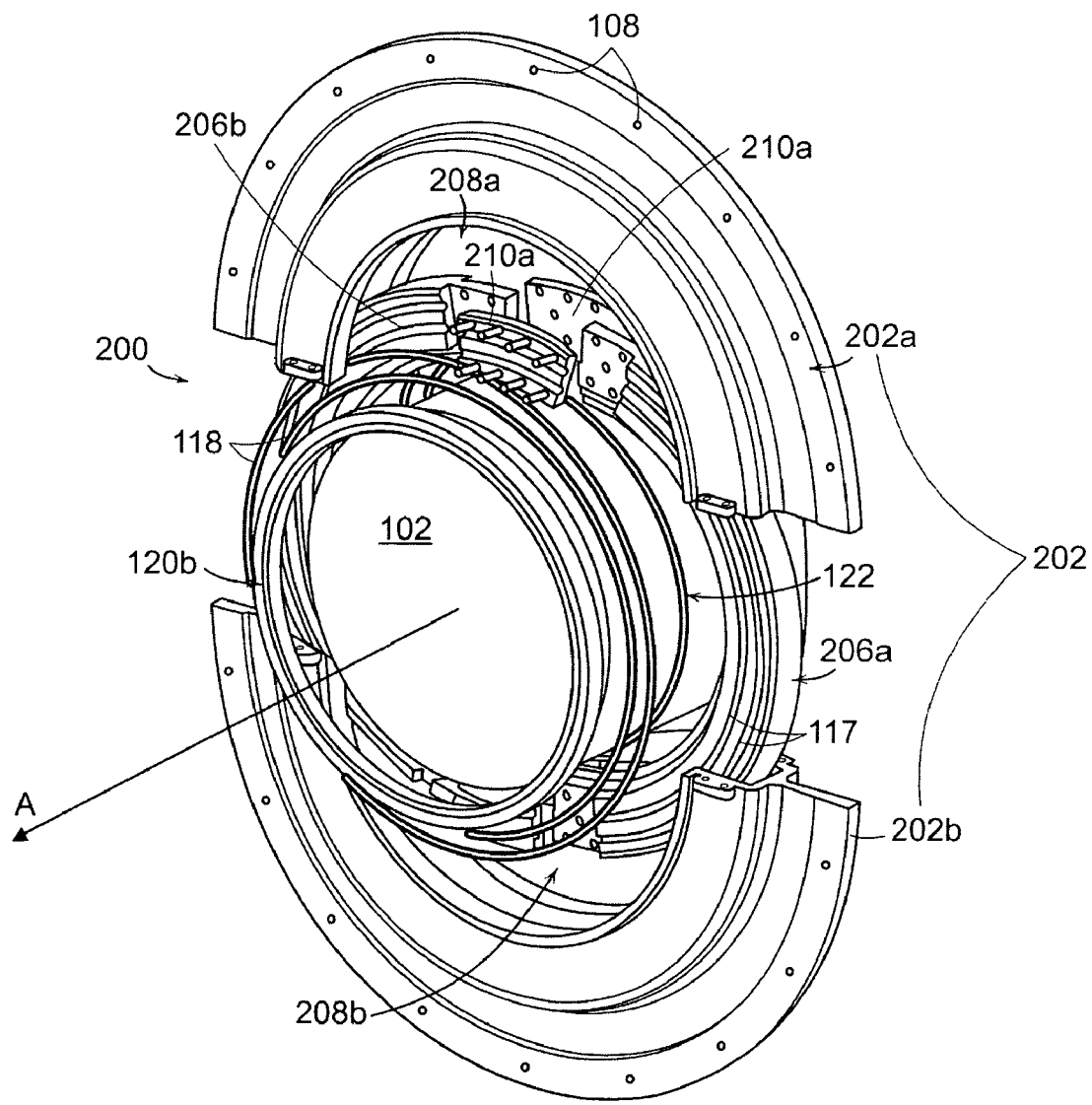
FIG. 2 is an exploded perspective view of a system that reduces a flow of a fluid between a shaft and a housing that embodies the invention.

FIG. 2 is an exploded perspective view of a system 200 that reduces a flow of a fluid between a shaft 102 and a housing. The system 200 includes two housing portions 202a and 202b that cooperate to form a single housing (collectively 202) disposed circumferentially about the shaft 102. The shaft 102 defines a longitudinal axis A. Each of the housing portions 202a and 202b define a plurality of through-holes 108 for securing the housing portions 202a and 202b to a surface or a bulkhead (not shown) through which the shaft 102 passes. Each of the housing portions 202a and 202b are a one-half ring-shaped structure each circumscribing approximately one-half of the shaft 102. Other configurations for the housing portions are possible (e.g., one-quarter-circles or one-third circles) for disposing the housing 202 about the shaft 102.

The system 200 includes two alignment rings 206a and 206b that cooperate to form a single alignment ring disposed within the housing 202 and circumferentially about the shaft 102. The alignment rings 206a and 206b are secured with respect to each other by connections 208a and 208b. The connection 208a features two connection plates 210a and 210b. An identical set of connection plates are used for the connection 208b (hidden in perspective). A plurality of connectors 212 (e.g., bolts, screws, rivets, or fasteners) pass through the first connection plate 210a, a portion of either or both of the alignment rings 206a and 206b, and the second connection plate 210b, and are axially secured to form a tight fit among the components. In some embodiments, the alignment rings 206a and 206b are fitted tightly together to form the alignment ring (e.g., with a friction fit).

Each of the alignment rings 206a and 206b and the connection plates 210a define annular grooves 117 (e.g., the annular grooves 117 of FIG. 1) for accommodating o-rings 118. Similarly, each of the alignment rings 206a and 206b and the connection plates 210b define annular grooves 117 (hidden in perspective) for accommodating o-rings 118 (hidden in perspective) on the opposite face along the axis A of the alignment rings 206a and 206b and connection plates 210b. The o-rings 118 are circumferentially continuous about the shaft 102 within the annular groove 117. In some embodiments, the o-rings 118 are not circumferentially continuous (e.g., they are split o-rings) to enable positioning about the shaft 102 without sliding the o-rings 118 over the length of the shaft 102 (e.g., to a location mid-shaft).

The system 200 also includes a ring 122 and seals 120a and seal 120b disposed circumferentially about the shaft 102. For clarity of illustration purposes, the seal 120a is not shown. The ring 122 and the seal 120b are circumferentially continuous about the shaft 102. In some embodiments, neither the alignment ring 122 nor the seal 120b is circumferentially continuous to enable positioning about the shaft 102 mid-shaft similar to the split o-ring.

Figure 3:
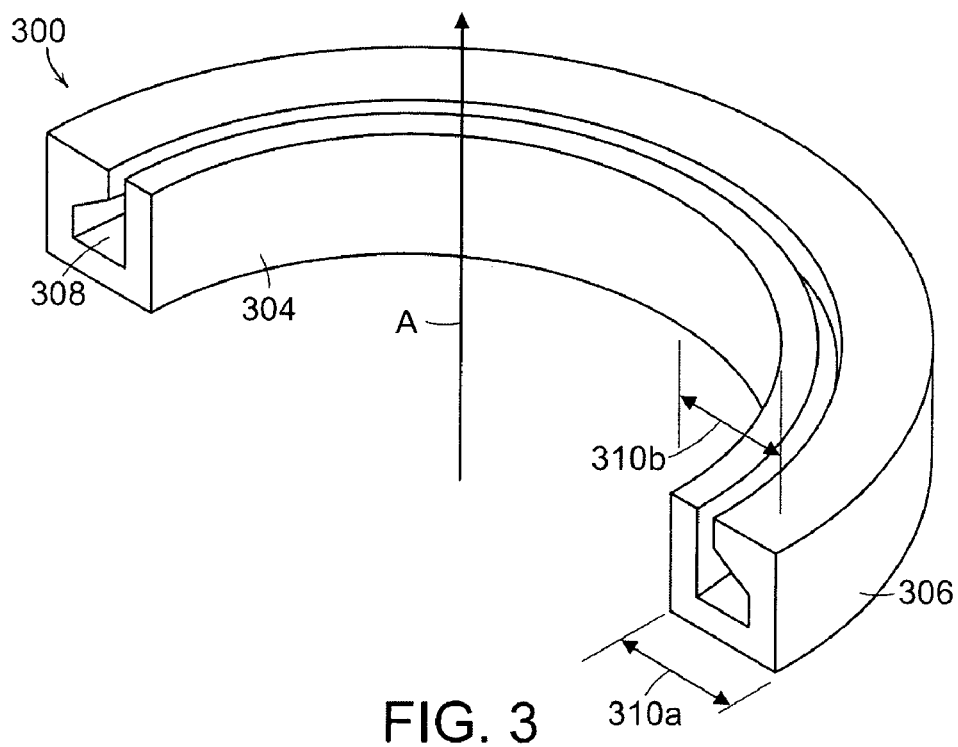
FIG. 3 is a cross-sectional perspective view of a lip seal including a pocket designed to contain a gel material, according to an illustrative embodiment of the invention.

FIG. 3 is a cross-sectional perspective view of a lip seal 300 including a pocket 308 designed to contain a gel material that embodies the invention. The seal 300 is illustrated as a half circle for disposing about a shaft (not shown) along the longitudinal axis A (e.g., the longitudinal axis A of the shaft 102 of FIGS. 1 and 2. In some embodiments, the seal 300 is formed of an elastomer or a rubber material. In some embodiments, the seal 300 is a unitary structure and forms a substantially continuous ring for disposing about the shaft. In some embodiments, the seal 300 may be formed of one or more components that cooperate to form a substantially continuous ring.

The seal 300 includes a first surface 304 for disposing adjacent the shaft and a second surface 306 for reacting against an external component (e.g., the alignment ring 116, the connection plate 110, the housing 104, or a combination of these components of FIG. 1). The seal 300 defines a pocket 308 designed to house or contain a gel material (not shown) that expands in the presence of a fluid. When a fluid is present, the gel material expands and reacts against the interior of the pocket 308.

In some embodiments, the seal 300 is formed of a material sufficiently rigid to prevent the first surface 304 from engaging the shaft in the absence of a fluid. The material is sufficiently pliable to permit expansion of the gel material to deform the seal 300 in the presence of a fluid such that the first surface 304 engages the shaft. For example, the seal may be formed of an elastomer material or a rubber material (e.g., natural or synthetic rubber). Because the second surface 306 reacts against the relatively fixed external component (e.g., the housing 202 or alignment rings 206a and 206b of FIG. 2), the first surface 304 expands substantially radially toward the shaft that is aligned with the axis A.

In one embodiment, tests have shown that in the absence of fluid, the distance 310a is about 12.7 mm, and the distance 310b is about 14.6 mm, providing a clearance or gap relative to the shaft of about 1 mm from the seal. When fluid was present, the gel material in the pocket 308 deformed the seal 300. The distance 310a remained approximately the same (i.e., about 12.7 mm). The distance 310b expanded to about 16.5 mm, sufficient to overcome the gap of about 1 mm clearance between the seal 300 and the shaft. In this embodiment, the expansion of the distance 310b exceeded about 16.5 mm when an external component (e.g., the housing 202 or the alignment rings 206a and 206b of FIG. 2) was in contact with the second surface 306. The greater expansion provides a stronger (e.g., reinforced) and more robust sealing interface between the seal 300 and the shaft.

Figure 4:
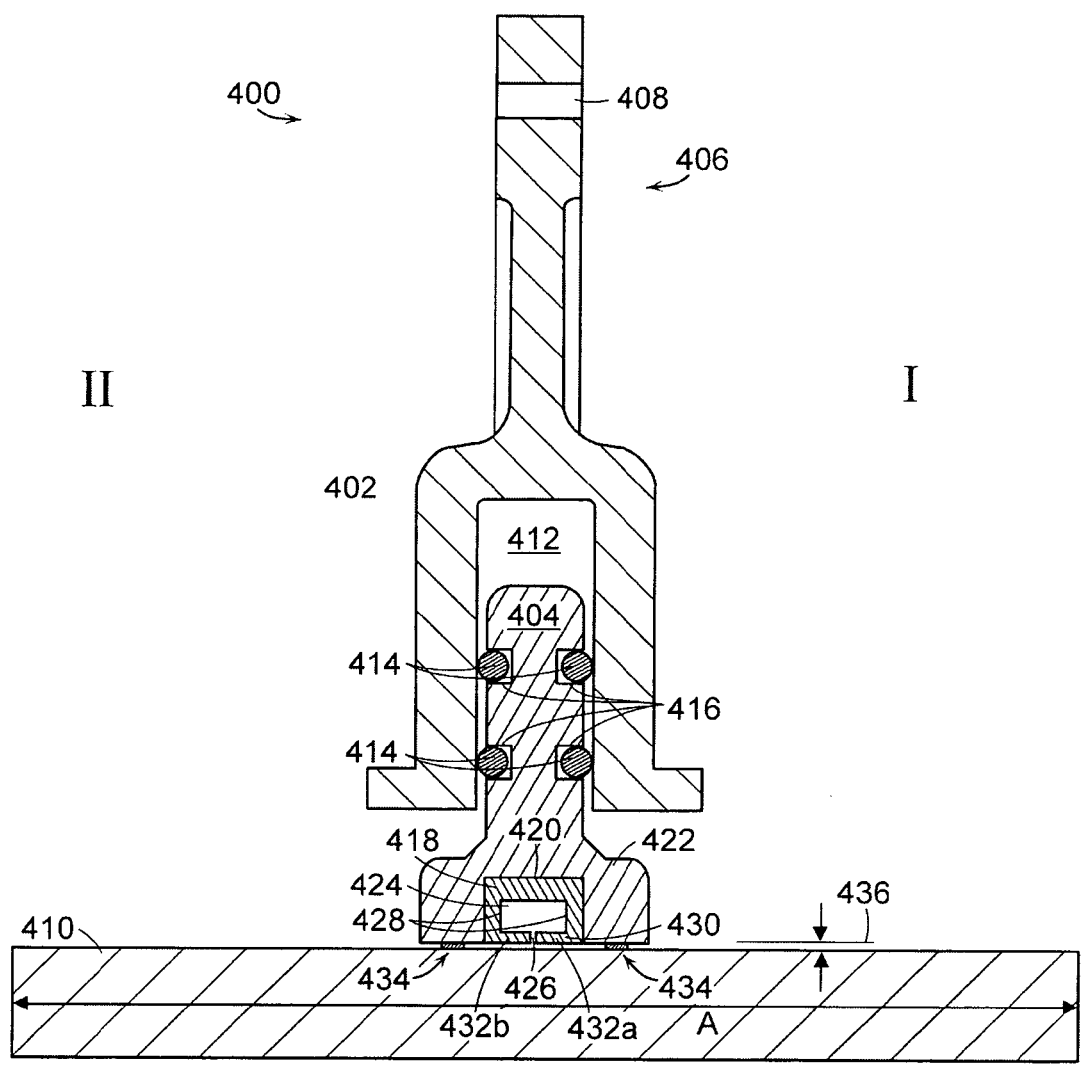
FIG. 4 is a cross-sectional view of a system, according to an illustrative embodiment of the invention.

FIG. 4 is a cross-sectional view of a system 400 that embodies the invention. The system 400 includes a housing 402 disposed relative to an alignment ring 404. The housing 402 is coupled to an extensive portion 406 having one or more through-holes 408 for securing the system 400 to a wall or surface (e.g., bulkhead) through which a shaft 410 passes along a longitudinal axis A. The housing 402 defines an interior surface 412. The interior surface 412 can create a seal with respect to the alignment ring 404 by reacting against one or more o-rings 414 disposed with respect to the alignment ring 404. Annular grooves 416 within the alignment ring 404 accommodate the o-rings 414.

The system 400 includes a seal 418 disposed relative to a cavity 420 in a portion 422 of the alignment ring 404 configured to be disposed adjacent the shaft 410. The seal 418 defines a pocket 424 and an opening 426 to permit a fluid to interact with a gel material (not shown) disposed in the pocket 424. In some embodiments, the seal 418 is referred to as a "back-to-back" seal because when the gel material expands in the presence of a fluid, the gel material reacts against opposing faces 428 of the pocket 424 to force the bottom portion 430 (e.g., two oppositely-oriented axial lips 432a and 432b) of the seal 418 radially toward the shaft 410. The system 400 also includes two rings 434 disposed between the shaft 410 and the system 400. In general, each of the rings 434 is similar to the ring 122 discussed above with respect to FIG. 1.

In some embodiments, the seal 418 is positioned or secured with respect to the alignment ring 404 (e.g., the cavity 420), for example, by a friction fit. In some embodiments, the seal 418 is coupled to the alignment ring 404, for example, by bonding the seal 418 to the envelope 420 or by forming the seal 418 from the same material as the alignment ring 404. As fluid from a first compartment I migrates through a gap 436 or radial distance between the alignment ring 404 and the shaft 410 toward the second compartment II, the fluid enters the opening 426 of the seal 418. Fluid entering the opening 426 interacts with, contacts, or wets the gel material disposed inside the pocket 424. The gel material expands and forces the lips 432a and 432b into contact with the shaft 410 to create a fluid-tight seal with respect to the shaft 410. Expansion of the gel material within the pocket forces the seal 418 to engage the shaft 410. The system 400 resists premature wear on the seal 418 associated with frictional forces because the seal 418 does not contact or minimally contacts the shaft 410 in the absence of a fluid. In general, the gel material can include one or more of the features described regarding the embodiments discussed herein.

Figure 5:
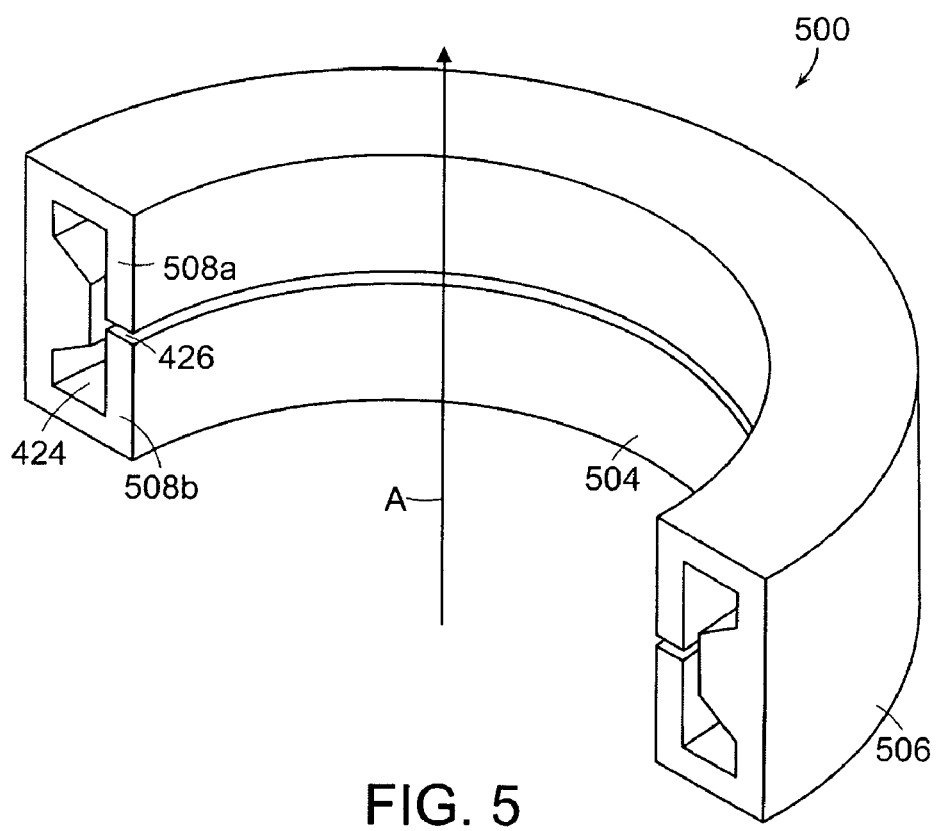
FIG. 5 is a cross-sectional perspective view of a back-to-back lip seal for use in the system of FIG. 4.

FIG. 5 is a cross-sectional perspective view of a back-to-back lip seal 500 for use in the system of FIG. 4 (as, for example, the seal 418 of FIG. 418). In some embodiments, the seal 500 is formed of an elastomer or a rubber material. In some embodiments, the seal 500 is a unitary structure and forms a substantially continuous ring for disposing about the shaft (not shown) defining the longitudinal axis A. In some embodiments, the seal 500 may be formed of one or more components that cooperate to form a substantially continuous ring.

The seal 500 includes a first portion 504 for disposing adjacent the shaft and a second surface 506 for reacting against an external component (e.g., the alignment ring 404, the housing 402, or both of these components of FIG. 4). The first portion 504 includes two oppositely-facing lips 508a and 508b with an opening 426 disposed between the lips 508a and 508b. The opening 426 permits a fluid that flows along the first portion 504 to contact or wet a gel material (not shown) disposed within a pocket 424 of the seal 500. The gel material expands in the presence of a fluid and reacts against an interior of the pocket 424. As the gel material expands, one or both of the lips 508a and 508b are deformed and moved toward the shaft to establish contact with the shaft to create a fluid-sealing interface. Contact between the lips 508a and 508b and the shaft reduces a flow of the fluid between the shaft and the seal 500. The gel material continues to provide expansion forces to reinforce or strengthen the seal 500 with respect to the shaft as the pressure differential increases between compartments of a structure (e.g., between compartment I and compartment II of FIG. 4).

In some embodiments, the seal 500 is formed of a material sufficiently rigid to prevent the first portion 504 or the lips 508a and 508b from engaging the shaft in the absence of a fluid. The seal 500 is formed of a material sufficiently pliable to permit deformation of the lips 508a and 508b by expansion of the gel material in the presence of a fluid to move the lips 508a and 508b towards the shaft. Because the second surface 506 reacts against the relatively fixed external component, the expansion is substantially toward the shaft. Although the seals 300 and 500 of FIGS. 3 and 5 respectively are illustrated as semi-circles, seals having other geometries (e.g., rectilinear geometries or other curvilinear geometries or combinations thereof) are within the scope of invention.

Figure 6:
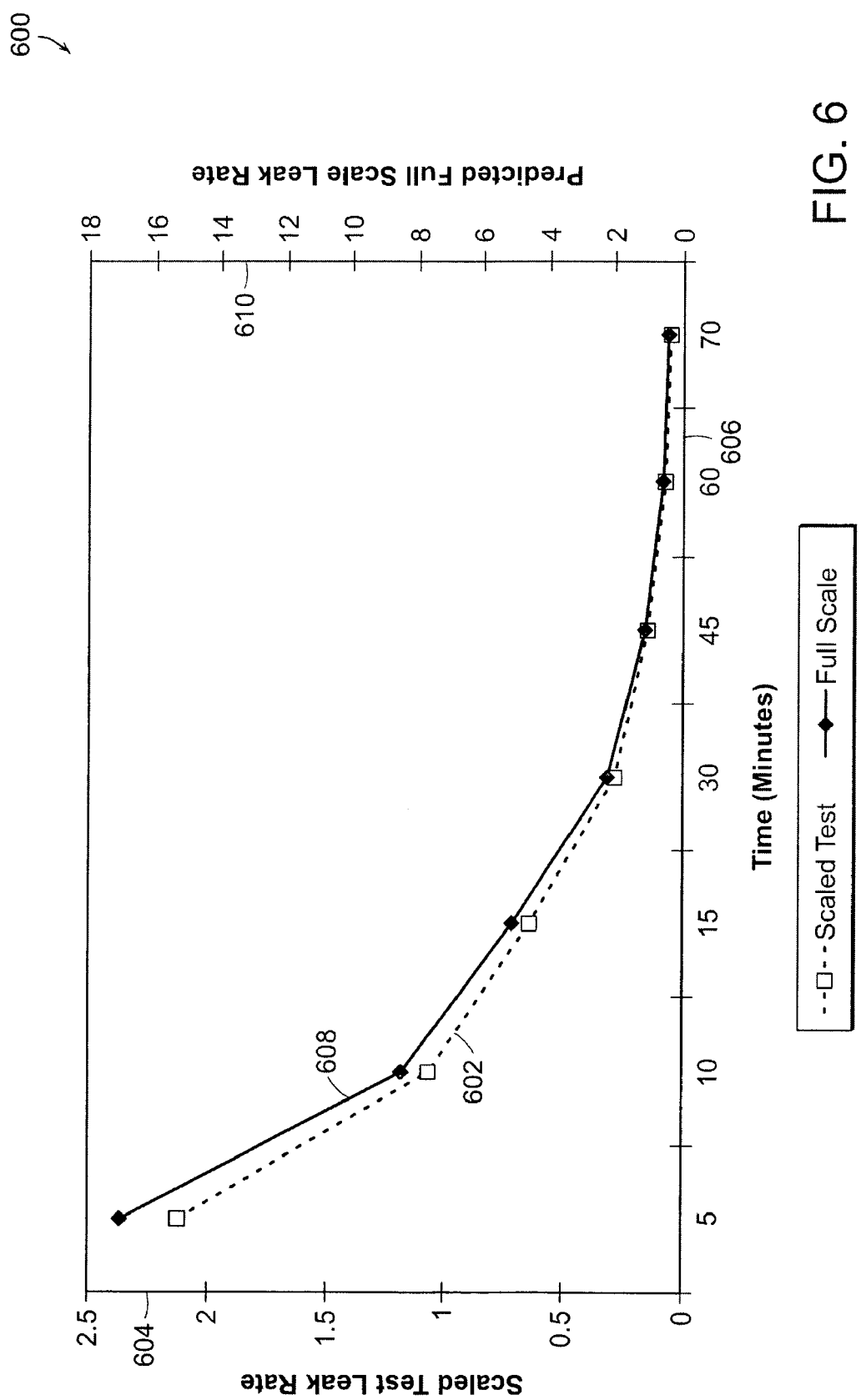
FIG. 6 is a graphical representation of leak rate data for a system that embodies the invention.

FIG. 6 is a graphical representation of leak rate data for a system that embodies the invention. The data was obtained from observation of the performance of a prototype system. The prototype system was designed as an approximately $\frac{1}{8}^{th}$-scale model of a system that could be used on a propeller shaft of a DDG-type destroyer. The system incorporated the elements of FIG. 1. For example, the diameter of the prototype shaft was about 63.5 mm. The diameter of the full-scale shaft on a DDG-type destroyer propeller is about 508 mm. The maximum revolutions per minute (RPM) for the full-scale shaft permitted by shipbuilder regulations is about 168 RPM. The $\frac{1}{8}^{th}$-scale prototype was tested at about 1,344 RPM to account for the difference in shaft diameter. The test setup included a first compartment in an ambient pressure environment and a second compartment in a pressurized environment (e.g., in the presence of water). The pressure drop between the first compartment and the second compartment caused the water to seek to migrate towards the lower-pressure first compartment. The leak rate of water entering the first compartment was measured during the experiment.

The graph 600 includes a first curve 602 of the leak rate obtained with the prototype system. The first curve 602 corresponds to the leak rate values in U.S. pints/hour of the vertical axis 604 against time (minutes) on the horizontal axis 606. The graph 600 also includes a second curve 608 mapping the leak rate in U.S. pints/hour of the vertical axis 610 against time (minutes) on the horizontal axis 606. The curve 608 represents the predicted performance of a system designed for use in the full-scale system for the DDG-type destroyer illustrating expected data based on the first plot 602. The data represented by the second curve 608 is a linear extrapolation of the data represented by the first curve 602 (scaled by a factor of 8 to compensate for the $\frac{1}{8}^{th}$-scale of the prototype).

The data associated with plot 602 reflects a seal (e.g., the seals 120a and 120b) having hardness of about Shore durometer of A60. Seals of other hardness were also successfully tested. Seals having hardness in a range from about a Shore durometer of A20 to about a Shore durometer of A60 also have been used. In some embodiments, the hardness value chosen for a particular seal depends on usage parameters associated with the seal, for example, the amount of time that the seal will be active. During testing, the gel material disposed within the seal (e.g., within a pocket of the seal) responded to the presence of a fluid, in this case water, within a few seconds of exposure to the fluid. The first curve 602 illustrates that the leak rate from the first compartment I to the second compartment II decreases to about 1.5 U.S. pints/hour (about 0.197 ml/s) after about 10 minutes. Further, the leak rate is less than 0.1 U.S. pints/hour (about 0.0131 ml/s) after about one hour.

The second curve 608 illustrates that the leak rate is expected to be about 9 U.S. pints/hour (about 1.183 ml/s)

after about 10 minutes and less than about 0.5 U.S. pints/hour (about 0.065 ml/s) after one hour. Additionally, the leak rate observed under exemplary pressure differentials of about 7.5 psid (pounds per square inch difference) (about 5,273 kg/m$^2$) and 15.0 psid (about 10,550 kg/m$^2$) was lower than that of the first curve 602 or the second curve 608 because increases in differential pressure increase the sealing ability of the seal. In some embodiments, marginally higher leak rates were obtained when the $\frac{1}{8}^{th}$-scale shaft was spinning at about 720 and 1440 RPM (corresponding to about 90 and 180 RPM for the full-scale shaft).

Figure 7:
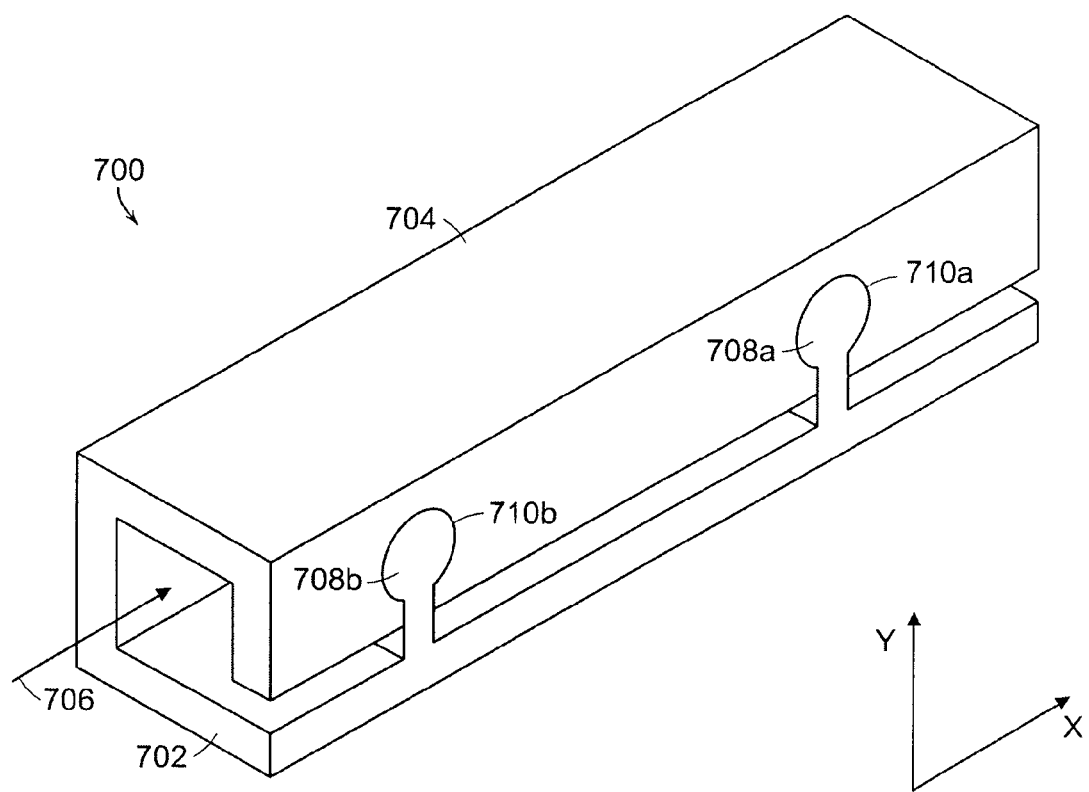
FIG. 7 is a cross-sectional perspective view of a seal according to an illustrative embodiment of the invention.

FIG. 7 is a cross-sectional perspective view of a seal 700 that embodies the invention. The seal 700 includes a lip portion 702 and an upper portion 704. A pocket 706 is defined by the lip portion 702 and the upper portion 704. In some embodiments, a gel material (not shown) is disposed within the pocket 706. The seal 700 includes two connector portions 708a and 708b (generally 708) that extend from the lip portion 702 toward the upper portion 704 along the Y-axis. The upper portion 704 defines corresponding surfaces 710a and 710b (generally 710) configured for mating with the connector portions 708a and 708b. In some embodiments, the seal 700 is made from an elastomer material or a rubber material (e.g., natural or synthetic rubber).

In some embodiments, the connector portions 708a and 708b prevent the lip portion 702 from moving away from the upper portion 704 (e.g., along the Y-axis) under, for example, the influence of gravity or from the weight of the gel material on the lip portion 702. In the presence of a fluid, the gel material within the pocket 708 expands and urges the lip portion 702 away from the upper portion 704. The connector portions 708a and 708b react against the corresponding surfaces 710a and 710b of the upper portion 704 to resist movement of the lip portion 702. The gel material provides an expansion force sufficient to overcome this resistance and dislodge the connector portions 708a and 708b from the corresponding surfaces 710a and 710b. After the connector portions 708a and 708b have been dislodged, the gel material can move the lip portion 702 away from the upper portion 704. Alternative geometries, quantities, and configurations of the connector portions 708 and the corresponding surfaces 710 are contemplated in alternative embodiments of the invention.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A fluid-activated shaft bulkhead seal system comprising:
   an annular housing fixed with respect to a bulkhead and about a rotating shaft extending through the bulkhead and the annular housing;
   an annular sealing structure including an inward alignment ring about and spaced from the rotating shaft, the sealing structure sealed and moveable with respect to the annular housing when the rotating shaft contacts the alignment ring;
   the annular sealing structure supporting a pair of lip seals, one on each side of the alignment ring, each lip seal including an outwardly facing pocket between a lip portion spaced from the rotating shaft and a portion abutting the sealing structure;
   a foam body in the pocket of each lip seal; and
   each foam body including a gel material configured to expand the foam body in the presence of fluid urging the lip portions of the lip seals into contact with the rotating shaft to seal the sealing structure with respect to the rotating shaft.

2. The fluid-activated shaft seal system of claim 1 in which the annular sealing structure resides partially inside the annular housing.

3. The fluid-activated shaft seal system of claim 2 in which the sealing structure includes opposing side grooves each supporting an O-ring frictionally mated with an inside face of the annular housing.

4. The fluid-activated shaft seal system of claim 1 in which the alignment ring is closer to the shaft than the lip portions of each lip seal when the foam bodies are not expanded.

5. The fluid-activated shaft seal system of claim 1 in which the gel material is configured to contract in the absence of fluid returning the lip portions of the lip seals into a spaced relationship with respect to the shaft.

* * * * *